United States Patent
Shinkazh et al.

(10) Patent No.: US 11,110,374 B2
(45) Date of Patent: Sep. 7, 2021

(54) CONTINUOUS COUNTERCURRENT SPIRAL CHROMATOGRAPHY

(71) Applicant: CHROMATAN INC., Lower Gwynedd, PA (US)

(72) Inventors: Oleg Shinkazh, Philadelphia, PA (US); Dmitriy Fedorenko, Philadelphia, PA (US)

(73) Assignee: CHROMATAN INC., Lower Gwynedd, PA (US)

(*) Notice: Subject to any disclaimer, the term of this patent is extended or adjusted under 35 U.S.C. 154(b) by 113 days.

(21) Appl. No.: 16/497,700

(22) PCT Filed: Mar. 28, 2018

(86) PCT No.: PCT/US2018/024823
§ 371 (c)(1),
(2) Date: Sep. 25, 2019

(87) PCT Pub. No.: WO2018/183483
PCT Pub. Date: Oct. 4, 2018

(65) Prior Publication Data
US 2020/0030717 A1    Jan. 30, 2020

Related U.S. Application Data

(60) Provisional application No. 62/477,917, filed on Mar. 28, 2017.

(51) Int. Cl.
*B01D 15/14* (2006.01)
*B01D 15/18* (2006.01)
(Continued)

(52) U.S. Cl.
CPC ......... *B01D 15/1807* (2013.01); *B01D 15/14* (2013.01); *B01D 15/3804* (2013.01);
(Continued)

(58) Field of Classification Search
CPC ........ G01N 30/42; G01N 30/58; B01D 15/14; B01D 15/1807; B01D 15/3804; B01D 15/203; B01L 3/502753
See application file for complete search history.

(56) References Cited

U.S. PATENT DOCUMENTS 4,789,476 A    12/1988  Schulz
5,715,946 A     2/1998  Reichenbach
(Continued)

FOREIGN PATENT DOCUMENTS

CN    104941251 A    9/2015
FR      2918900 A1   1/2009
(Continued)

OTHER PUBLICATIONS

PCT International Search Report and Written Opinion, dated Aug. 2, 2018.
(Continued)

*Primary Examiner* — Benjamin L Lebron
(74) *Attorney, Agent, or Firm* — McNees Wallace & Nurick LLC

(57) ABSTRACT

A system, module and method for continuous countercurrent spiral chromatography are disclosed. The module includes an input port for receiving an input solution, a first mixer for mixing the input solution with a recycled solution to produce a first mixed output, a stage I separator for concentrating the first mixed output to produce a stage I solid fraction, a second mixer for mixing the stage I solid fraction from the stage I separator and an optional buffer solution to produce a second mixed output, and a stage II separator for concentrating the second mixed output to produce a stage II solid fraction which exits the module. At least one separator is a spiral separator. The system includes a plurality of modules, and at least one of the plurality of modules includes a spiral
(Continued)

separator. The method includes purifying an unpurified solution with the plurality of modules.

20 Claims, 12 Drawing Sheets

(51) Int. Cl.
    *B01D 15/38*     (2006.01)
    *B01L 3/00*     (2006.01)
    *G01N 30/42*     (2006.01)
    *G01N 30/58*     (2006.01)
    *B01D 15/20*     (2006.01)

(52) U.S. Cl.
    CPC ........ *B01L 3/502753* (2013.01); *G01N 30/42* (2013.01); *G01N 30/58* (2013.01); *B01D 15/203* (2013.01)

(56) References Cited

U.S. PATENT DOCUMENTS

| | | | |
|---|---|---|---|
| 5,866,000 | A | 2/1999 | Yeh |
| 6,312,603 | B1 | 11/2001 | Nishizawa |
| 7,309,486 | B1 | 12/2007 | Zamoyski |
| 7,947,175 | B2 | 5/2011 | Shinkazh |
| 7,988,859 | B2 | 8/2011 | Shinkazh |
| 8,186,931 | B2 | 5/2012 | Borntrager et al. |
| 9,433,880 | B2 | 9/2016 | Lean et al. |
| 9,458,489 | B2 | 10/2016 | Lim et al. |
| 9,789,485 | B2 | 10/2017 | Han et al. |
| 2006/0240964 | A1 | 10/2006 | Lolachi et al. |
| 2007/0026381 | A1 | 2/2007 | Huang et al. |
| 2007/0131622 | A1 | 6/2007 | Oakey et al. |
| 2007/0263477 | A1 | 11/2007 | Sudarsan et al. |
| 2008/0128331 | A1 | 6/2008 | Lean et al. |
| 2009/0053749 | A1 | 2/2009 | Manalis et al. |
| 2009/0136982 | A1 | 5/2009 | Tang et al. |
| 2009/0173680 | A1 | 7/2009 | Pfeiffer |
| 2009/0283474 | A1* | 11/2009 | Achard .............. B01D 21/0087 210/643 |
| 2010/0276351 | A1 | 11/2010 | Ito |
| 2011/0011462 | A1 | 1/2011 | Kojima et al. |
| 2011/0096327 | A1 | 4/2011 | Papautsky et al. |
| 2012/0028272 | A1 | 2/2012 | Sethu et al. |
| 2017/0045483 | A1 | 2/2017 | Shinkazh |

FOREIGN PATENT DOCUMENTS

| | | |
|---|---|---|
| WO | 2011109762 A1 | 9/2011 |
| WO | 2014046621 A1 | 3/2014 |

OTHER PUBLICATIONS

Ali Asgar Saleem Bhagat, Inertial Microfluidics for Particle Separation and Filtration, Thesis submitted to the University of Cincinnati, 2009.

Ito et al., "Spiral Countercurrent Chromatography", Journal of Chromatrographic Science, 2013, 51, p. 726-738, published by Oxford University Press.

First Examination Report for Related India Application 201927040937 dated Jun. 25, 2021.

Yoichiro Ito, "Spiral Column Configuration for Protein Separation by High-Speed Countercurrent Chromatography," Chemical Engineering and Processing 49 (2010) 782-792 (available online Aug. 19, 2009) [This is Footnote 19 of NPL 1 cited above, and is therefore considered to have been first cited in the communication from a foreign patent office represented above as NPL 2].

* cited by examiner

CONTINUOUS COUNTERCURRENT SPIRAL CHROMATOGRAPHY

REFERENCE TO RELATED APPLICATIONS

This application claims priority from provisional application U.S. Ser. No. 62/477,917, filed on Mar. 28, 2017, and entitled "Continuous Countercurrent Spiral Chromatography," the entirety of which is hereby incorporated by reference herein.

FIELD OF THE INVENTION

The present invention is generally related to chromatography and adsorptive separations. More specifically, this invention relates to a method, system, and apparatus of continuous countercurrent spiral chromatography using continuous countercurrent flow and spiral separators with which to facilitate separation of the desired product and enhance efficiency of the entire chromatography process.

BACKGROUND OF THE INVENTION

There has been a significant and sustained growth in new drug production featuring monoclonal antibodies and other proteins, approximately 15-20% annually. This growth is due to expanding drug pipelines, as well as more efficient cell lines and bioreactor growth optimizations. The annual bio-production costs are currently estimated at $2.6 billion. One of the most significant investments a drug manufacturer has to make is process chromatography (approximately 30% or $850 million annually).

One of the major costs in the production of protein drugs is downstream bioprocessing, which can account for as much as 80% of the overall manufacturing cost. Currently, the dominant method used for protein purification is column chromatography. Protein A affinity chromatography is used in the purification of nearly all monoclonal antibodies due to its very high selectivity and highly robust operation. However, the protein A resins used in column chromatography are very expensive and a single protein A column designed for initial capture of a monoclonal antibody costs approximately $15 million for the resin alone. Another major problem associated with column chromatography is that it is a high-pressure operation. Significant advances in cell culture technology in the past five years have resulted in a ten-fold increase in product titers, which has led to a strategic transformation in bio-manufacturing to single-use disposable processes that offer higher flexibility, lower cost, and continuous, on-demand manufacturing. Single-use equipment can significantly reduce time-to-market for new drug substances.

U.S. Pat. Nos. 7,947,175 and 7,988,859 to Oleg Shinkazh, entitled, "Continuous Countercurrent Tangential Chromatography" and "Countercurrent Tangential Chromatography Methods, Systems and Apparatus", respectively, disclose methods, systems and apparatus for a new technique of continuous countercurrent tangential chromatography, which address some of the challenges of the prior art. U.S. patent application Ser. No. 15/305,850 (published as U.S. Patent Application Publication No. 2017/0045483A1) to Oleg Shinkazh, entitled "High Efficiency Continuous Countercurrent Tangential Chromatography" discloses methods, systems and apparatus further advancing the new technique of continuous countercurrent tangential chromatography. U.S. Pat. Nos. 7,947,175 and 7,988,859, and U.S. Patent Application Publication No. 2017/0045483A1 are incorporated herein in their entirety as if fully restated.

In contrast to conventional column chromatography, where the resin particles are packed in a fixed-bed column, the continuous countercurrent tangential chromatography process utilizes the resin in the form of a slurry, which flows through a series of static mixers and tangential flow filtration membrane modules as shown in FIGS. 1 and 2. Continuous countercurrent tangential chromatography is a low pressure operation (<20 psi) with a disposable flow path, and thus it may eliminate some of the significant deficiencies associated with protein A column chromatography. The continuous countercurrent tangential chromatography (CCTC) system running in bind/elute mode is a combination of multiple steps: binding, washing, elution, regeneration and equilibration. However, some embodiment may have fewer or additional steps. By way of example, a CCTC flow-through process mode does not include an elution step with the product collected in the binding and wash steps. The resin is introduced into every stage via retentate pumps which are installed before every static mixer. The hydrodynamics are stabilized by using the flow of the retentate pumps that serve both as pumps and as quasi check valves that guide the flow of buffer in a countercurrent manner to the resin through each step. Since each step is acting as a closed system, the buffer pumped into the step will be equal to the resulting flow rate of the permeate stream.

The separation of resin and fluid phase in the CCTC system is performed by hollow fiber membranes. However, membrane fouling in the CCTC system may inhibit long term performance. The effect of membrane fouling is shown in FIG. 3. With time, the pressure gradually increases which limits the performance of the system to fed batch processes that are typically less than 24 hours in length.

A particle separation and concentration system utilizing flow in a spiral channel is described by Lean et al. in U.S. Pat. No. 9,433,880, entitled "Particle Separation and Concentration System." In this patent, an invention is described which is based on size and mass separation of suspended particles which are made to flow in a spiral channel. In the spiral channel, inward directed transverse pressure from fluid shear competes with outward directed centrifugal force, and the magnitudes of the two opposing forces depend on flow velocity, particle size, radius of curvature of the spiral section, channel dimensions, and viscosity of the fluid, leading to separation of particles.

A microfluidic device having curved micro-channels with non-rectangular cross-sections for particle focusing and mixing is described by Han et al. in U.S. Pat. No. 9,789,485, entitled "Micro-Fluidic Device and Uses Thereof." In this patent, it is claimed that the microfluidic device described therein could separate one or more particles by size from a mixture of particles. This spiral microfluidic separation device has a trapezoidal cross section, focusing Dean vortices and inertial lift forces within the microchannel to provide separation. At specific flow conditions, the smaller components are trapped in Dean vortices which are skewed towards the outer wall while larger components stay towards the inner wall of the channel. U.S. Pat. No. 9,789,48, is incorporated herein in its entirety as if fully restated.

BRIEF DESCRIPTION OF THE INVENTION

In an exemplary embodiment, a continuous countercurrent spiral chromatography module includes a first input port, a first mixer, a stage I separator, a second mixer, a stage II separator, and at least one liquid fraction pump. The first input port is for receiving an input solution. The first mixer is for mixing the input solution with a recycled solution from a second input port to produce a first mixed output. The stage I separator is for concentrating the first mixed output to produce a stage I solid fraction, wherein a stage I liquid fraction exits the stage I separator via a first output port. The second mixer is for mixing the stage I solid fraction from the stage I separator and an optional buffer solution from a third input port to produce a second mixed output. The stage II separator is for concentrating the second mixed output to produce a stage II solid fraction which exits the module from the stage II separator via a second output port, wherein a stage II liquid fraction exits the module from the stage II separator via a third output port. The recycled solution from the third output port flows countercurrent to the input solution into the second input port. At least one of the stage I separator and the stage II separator is a spiral separator including at least one inlet, a curvilinear channel arranged and disposed to generate at least one Dean vortex, at least one liquid fraction outlet, and at least one solid fraction outlet.

In another exemplary embodiment, a continuous countercurrent spiral chromatography system having a plurality of modules, includes a binding step module for binding product from an unpurified product solution with a resin slurry, a washing step module for washing impurities from the resin slurry, and a regeneration step module for regenerating the resin slurry. At least one of the plurality of modules includes a plurality of stages with a solid fraction flow directed countercurrent to a resin slurry flow within the at least one of the modules. At least one of the plurality of modules includes a spiral separator having at least one inlet, a curvilinear channel arranged and disposed to generate at least one Dean vortex, at least one liquid fraction outlet, and at least one solid fraction outlet.

In another exemplary embodiment, a method for purifying an unpurified solution by continuous countercurrent spiral chromatography with a plurality of modules includes receiving the unpurified solution, receiving resin slurry from a resin slurry tank for containing the resin slurry, the resin slurry tank being isolated following discharge of the resin slurry from the resin slurry tank, a binding step for binding product in the unpurified product solution to the resin slurry from the resin slurry tank, a washing step for washing impurities from the resin slurry, optionally, an elution step for eluting product from the resin slurry after the washing step, capturing purified product solution, a regeneration step for cleaning the resin slurry, and providing buffer solutions for the steps. At least one of the plurality of modules includes a plurality of stages with a solid fraction flow directed countercurrent to a resin slurry flow within the at least one of the plurality of modules. At least one of the plurality of modules includes a spiral separator having at least one inlet, a curvilinear channel arranged and disposed to generate at least one Dean vortex, at least one liquid fraction outlet, and at least one solid fraction outlet.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
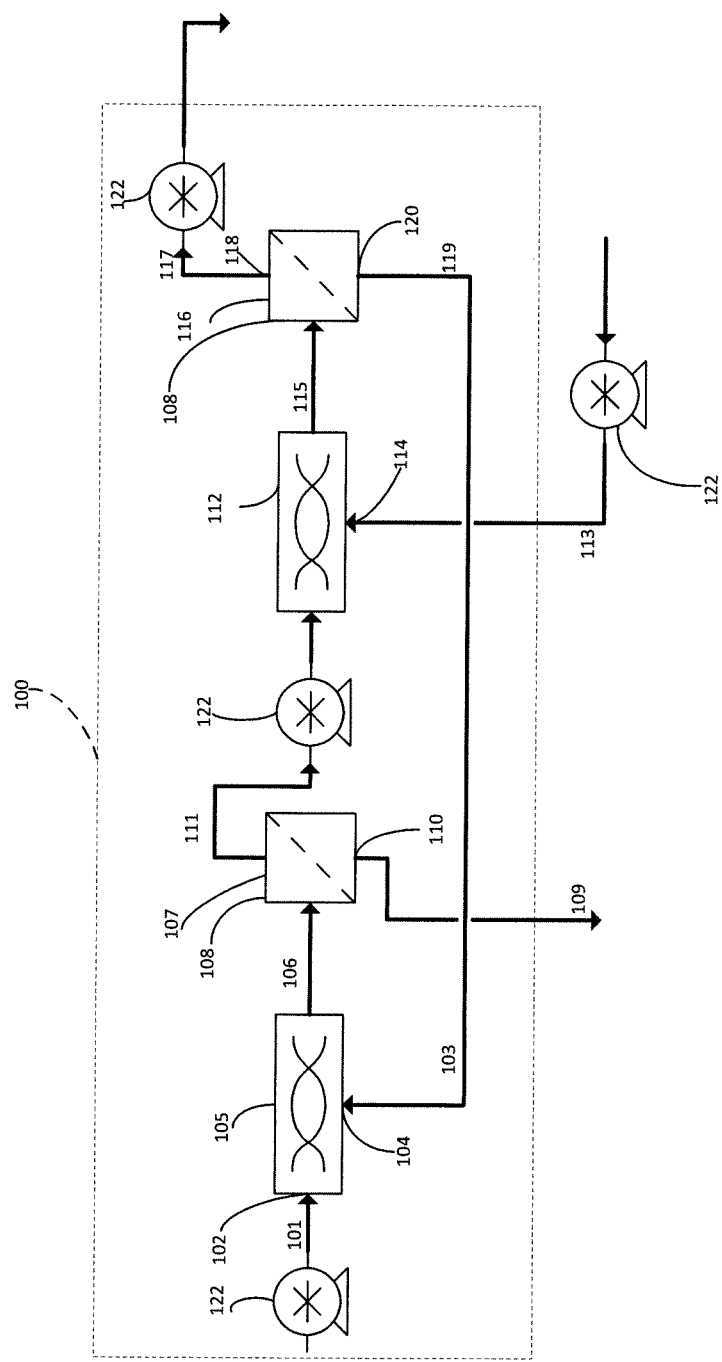
FIG. 1 is a schematic representation of a continuous countercurrent tangential chromatography module.

Definitions: The following terms of art shall have the below ascribed meanings throughout this Specification.

"Binding" step or mode indicates operation during which resin and unpurified product form a reversible complex (for positive chromatography), or during which resin and impurities form a reversible complex (for negative chromatography).

"Washing" step or mode indicates operation during which resin with bound product is washed with a washing buffer to rid the resin of impurities (for positive chromatography), or during which resin with bound impurities is washed with a washing buffer to wash out carryover product from the binding step (for negative chromatography).

"Elution" step or mode indicates operation during which the complex of resin and the product is reversed and the purified product is collected.

"Regeneration" step or mode indicates operation during which the resin is cleaned for the purpose of reuse or for later cycles.

"Equilibration" step or mode indicates operation during which the system is equilibrated in a neutral buffer.

"Solid particle load separation capacity" is the maximum amount of solid particle content in the unpurified solutions which may be introduced into a module or system without significantly reducing the process efficiency and rate of fouling of the module or system.

"Stage" indicates an interconnected separator and mixer.

"Single-pass module" is a module that performs one of the chromatographic operations, such as binding, washing, elution, and regeneration in a single pass.

Provided are exemplary systems, modules and methods. Embodiments of the present disclosure, in comparison to systems, modules and methods not utilizing one or more features disclosed herein, provide scalable, reliable, and disposable technology that utilizes a principle of recycling to significantly increase process efficiency, increase the scale of operation, and decrease resin costs, or combinations thereof.

The hollow fiber membranes of CCTC systems being replaced by spiral micro-fluidic particle sorter devices provide unexpected benefits. These spiral devices separate resin from the dissolved species using Dean Vortices at the curved outer wall of the device channel to selectively attract particles to one wall of the device. These devices, therefore, do not require a physical barrier such as a membrane for separating resin particles from dissolved species. The unexpected and significant benefits of countercurrent spiral chromatography system operation relative to CCTC systems include those described below, which benefits may be provided singly, in combinations with one another, or all together, depending on the embodiment.

Replacing hollow fiber membranes with spiral microfluidic particle sorter devices may significantly increase throughput due to the absence of gradual fouling found previously in membrane devices. Further, processing times may be extended from 24 hours up to about 30-90 days (up to 90-fold increase in throughput), as well direct integration of a countercurrent chromatography system with a perfusion bioreactor (which may run up to about 90 days).

Replacing hollow fiber membranes with spiral microfluidic particle sorter devices may significantly simplify hardware and system monitoring because the pressure for each countercurrent chromatography stage will no longer need to be monitored individually due to the absence of fouling. This may decrease the number of pressure gauges for a typical countercurrent chromatography operation from about 20 to about 6 (more than a 3-fold decrease), allowing for a simplified hardware design, lower cost for the skid and flow path, as well as increased ease of use because of significantly lower system monitoring.

Replacing hollow fiber membranes with spiral microfluidic particle sorter devices may improve manufacturing and supply chain robustness because the spiral devices may be made with various inexpensive manufacturing methods such as 3D printing, etching, and injection molding. Due to the simplicity of spiral devices, the spiral devices may require significantly decreased technical support for both flow path manufacturing and countercurrent chromatography operation. In addition, such devices may be manufactured directly by a system integration company without having to manage procuring, quality testing and troubleshooting membrane modules from a third party.

Replacing hollow fiber membranes with spiral microfluidic particle sorter devices may decrease process development requirements, increasing spiral device adoption because the time-consuming qualification of the membrane devices for fouling behavior will no longer be necessary. The entire countercurrent chromatography process may be scalable from standard benchtop experiments using small columns and beaker testing of the resin for binding capacity and kinetics. This may provide a greater degree of attractiveness of this process and decrease hurdles to market adoption.

Replacing hollow fiber membranes with spiral microfluidic particle sorter devices may significantly decrease the cost/gram of purified product by up to about 80% stemming from increased throughput, decreased costs of manufacturing of the device as compared to membrane modules, and decreased efforts for process development.

Replacing hollow fiber membranes with spiral microfluidic particle sorter devices may provide the capability for countercurrent chromatography purification of large molecules and aggregates (such as plasmid DNA, viral vector particles, vaccines, and RNA) which might otherwise quickly foul membrane filters, opening significant additional market opportunities for this new technology platform in comparison to CCTC with hollow fiber membranes.

Replacing hollow fiber membranes with spiral microfluidic particle sorter devices may increase the solid particle load separation capacity in comparison to CCTC with hollow fiber membranes.

Referring to FIG. 1, as more fully described in U.S. Pat. Nos. 7,947,175 and 7,988,859, and U.S. Patent Application Publication No. 2017/0045483A1, a continuous countercurrent tangential chromatography module 100 is shown (inside the dashed line). Input solution 101 enters at first input port 102, and the input solution 101 is mixed with a recycled solution 103 from second input port 104 inside first mixer 105. The first mixed output 106 from the first mixer 105 enters a stage I separator 107 which is a tangential flow filter 108, from which a stage I liquid fraction 109 exits the stage I separator 107 at a first output port 110. A stage I solid fraction 111 is fed into a second mixer 112, which may be mixed with an optional buffer solution 113 from a third input port 114 to produce a second mixed output 115. The second mixed output 115 from the second mixer 112 is fed into a stage II separator 116 which is a tangential flow filter 108. A stage II solid fraction 117 exits the continuous countercurrent tangential chromatography module 100 from the stage II separator 116 via a second output port 118, and a stage II liquid fraction 119 exits the continuous countercurrent tangential chromatography module 100 from the stage II separator 116 via a third output port 120. The stage II liquid fraction 119 may be the recycled solution 103. The continuous countercurrent tangential chromatography module 100 includes at least one pump 122.

Figure 2:
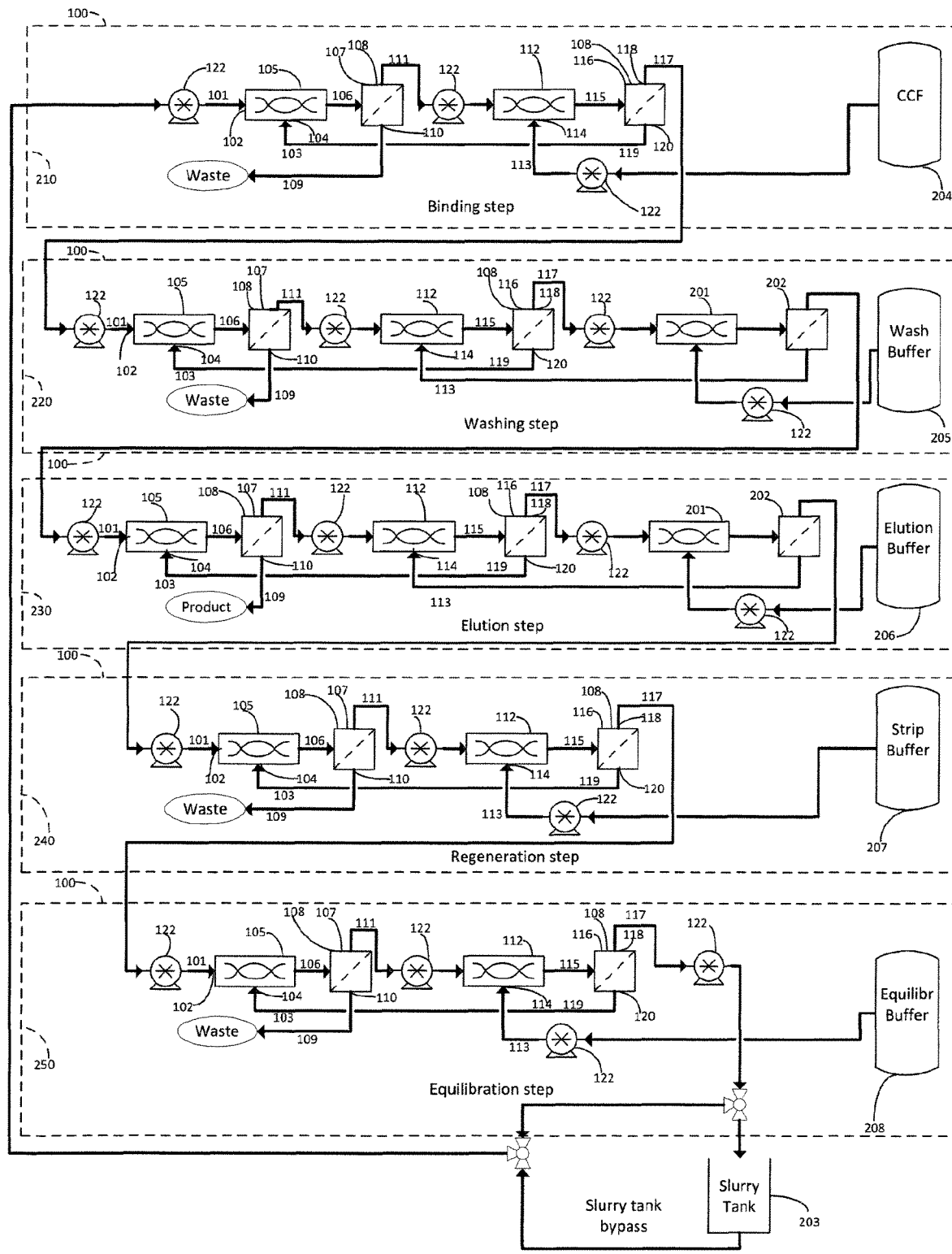
FIG. 2 is a schematic representation of a continuous countercurrent tangential chromatography system in continuous mode.

Referring to FIG. 2, as more fully described in U.S. Pat. Nos. 7,947,175 and 7,988,859, and U.S. Patent Application Publication No. 2017/0045483A1, a continuous countercurrent tangential chromatography system 200 operates in continuous mode. Binding step module 210, washing step module 220, elution step module 230, regeneration step module 240, and equilibration step module 250 operate in an analogous manner to the operation of continuous countercurrent tangential chromatography module 100 shown in FIG. 1, except that the washing step module 220 and elution step module 230 further include a third mixer 201 and a stage III separator 202. Binding step module 210 is connected to a resin slurry tank 203 at first input port 102 and a binding buffer tank 204 at third input port 114. Washing step module 220 is connected to binding step module 210 and wash buffer tank 205. Elution step module 230 is connected to washing step module 220 and elution buffer tank 206. Regeneration step module 240 is connected to elution step module 230 and strip buffer tank 207. Equilibration step module 250 is connected to regeneration step module 240 and equilibration buffer tank 208.

Figure 3:
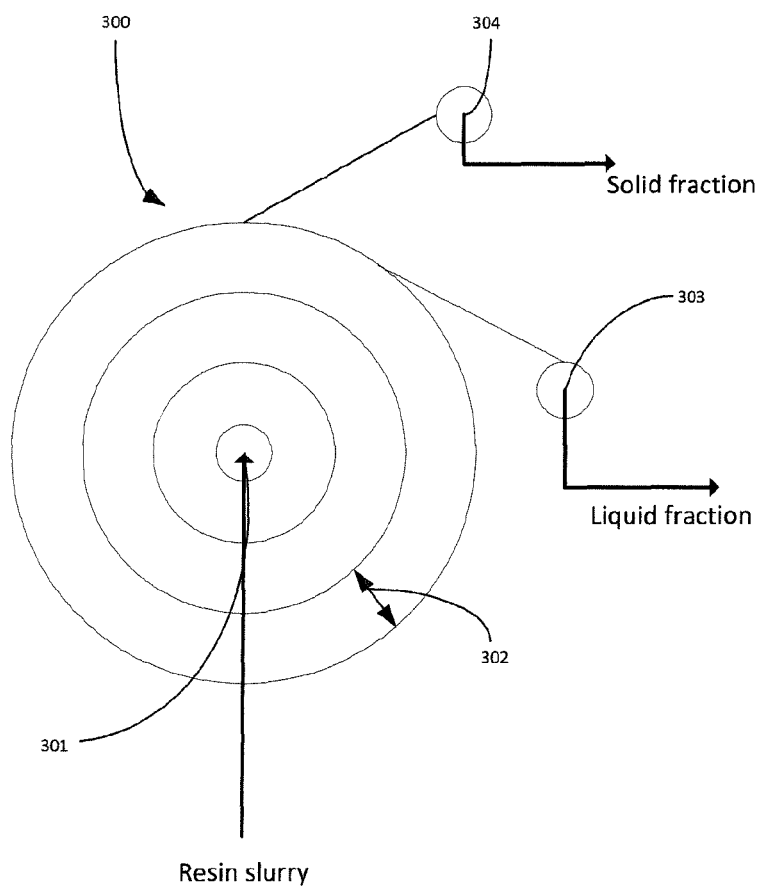
FIG. 3 is a schematic representation of a spiral separator, according to an embodiment of the present disclosure.

Referring to FIG. 3, as more fully described in U.S. Pat. No. 9,789,485, a spiral separator 300 includes at least one inlet 301, a curvilinear channel 302 arranged and disposed to generate at least one Dean vortex, at least one liquid fraction outlet 303, and at least one solid fraction outlet 304. The curvilinear channel 302 may include a rectangular cross-section, a non-rectangular cross-section, a trapezoidal cross-section, a square cross-section, an elliptical cross-section, a circular cross-section, an irregular cross-section, a rounded rectangular cross-section, a rounded square cross-section, a rounded trapezoidal cross-section, or combinations thereof.

Figure 4:
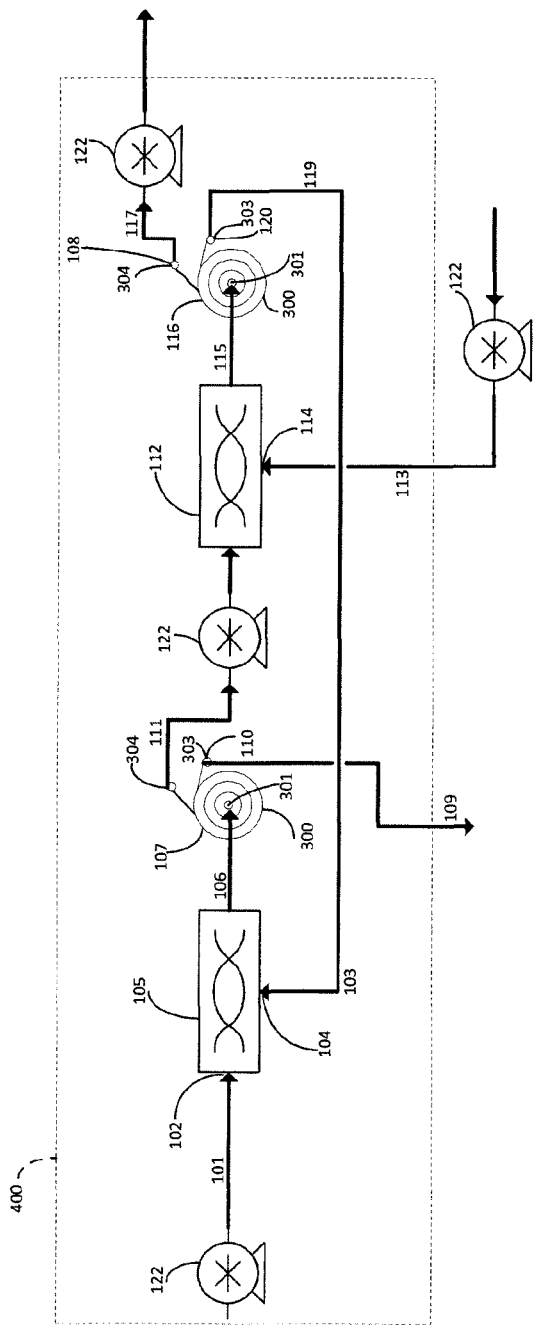
FIG. 4 is a schematic representation of a continuous countercurrent spiral chromatography module, according to an embodiment of the present disclosure.

Referring to FIG. 4, in one embodiment, at least one tangential flow filter 108 in the continuous countercurrent tangential chromatography module 100 of FIG. 1 is replaced by a spiral separator 300, forming a continuous countercurrent spiral chromatography module 400. The continuous countercurrent spiral chromatography module 400 includes a first input port 102 for receiving an input solution 101, a first mixer 105 for mixing the input solution 101 with a recycled solution 103 from a second input port 104 to produce a first mixed output 106, a stage I separator 107 for concentrating the first mixed output 106 to produce a stage I solid fraction 111 wherein a stage I liquid fraction 109 exits the stage I separator 107 via a first output port 110, a second mixer 112 for mixing the stage I solid fraction 111 from the stage I separator 107 and an optional buffer solution 113 from a third input port 114 to produce a second mixed output 115, a stage II separator 116 for concentrating the second mixed output 115 to produce a stage II solid fraction 117 which exits the module from the stage II separator 116 via a second output port 118 wherein a stage II liquid fraction 119 exits the continuous countercurrent spiral chromatography module 400 from the stage II separator 116 via a third output port 120, and at least one pump 122. The recycled solution 103 from the third output port 120 flows countercurrent to the input solution 101 into the second input port 104. At least one of the stage I separator 107 and the stage II separator 116 is a spiral separator 300. The stage I liquid fraction 109 may be waste or may be product.

In one embodiment, both the stage I separator 107 and the stage II separator 116 are spiral separators 300. In another embodiment (not shown), one of the stage I separator 107 and the stage II separator 116 is a spiral separator 300, and one is a tangential flow filter 108. In yet another embodiment (not shown), in which the continuous countercurrent spiral chromatography module 400 includes a stage III separator 202, one of the stage I separator 107, the stage II separator 116, and the stage III separator 202 is a spiral separator 300, and two are tangential flow filters 108, two of the stage I separator 107, the stage II separator 116, and the stage III separator 202 are spiral separators 300, and one is a tangential flow filter 108, or each of the stage I separator 107, the stage II separator 116, and the stage III separator 202 is a spiral separator 300.

In one embodiment, the input solution 101 includes a resin and an unpurified product solution. The unpurified product solution may include any suitable product, including, but not limited to, commodity chemicals, sugars, amino acids, nanoparticles, medicinal drugs, antibiotics, statins, proteins, monoclonal antibodies, fusion proteins, antibody drug conjugates, enzymes, viral-like particles, vaccines, DNA, RNA, or combinations thereof.

The first mixer 105 may be a static mixer or a non-static mixer. The second mixer 112 may be a static mixer or a non-static mixer. In one embodiment (not shown), in which the continuous countercurrent spiral chromatography module 400 includes a third mixer 201, the third mixer 201 may be a static mixer or a non-static mixer. The continuous countercurrent spiral chromatography module 400 may include any suitable combination of static and non-static mixers. The second mixer 112 may receive a clean buffer solution or may not receive a clean buffer solution.

In one embodiment, the continuous countercurrent spiral chromatography module 400 is a single-pass module in which the input solution 101 from the first input port 102 flows through the stage I separator 107 and the stage II separator 116 in a single pass.

In one embodiment, the continuous countercurrent spiral chromatography module 400 is operable with a higher resin to buffer flow rate than a comparative continuous countercurrent tangential chromatography module 100, and utilizes less buffer volume than the comparative continuous countercurrent tangential chromatography module 100. The continuous countercurrent spiral chromatography module 400 may be operable with a higher product concentration than a comparative continuous countercurrent tangential chromatography module 100.

In one embodiment, the continuous countercurrent spiral chromatography module 400 includes a solid particle load separation capacity of at least about 10 wt %, alternatively at least about 12 wt %, alternatively at least about 14 wt %, alternatively at least about 16 wt %, alternatively at least about 18 wt %, alternatively at least about 20 wt %, alternatively at least about 22 wt %, alternatively at least about 24 wt %, alternatively at least about 26 wt %, alternatively at least about 28 wt %, alternatively at least about 30 wt %.

Figure 5:
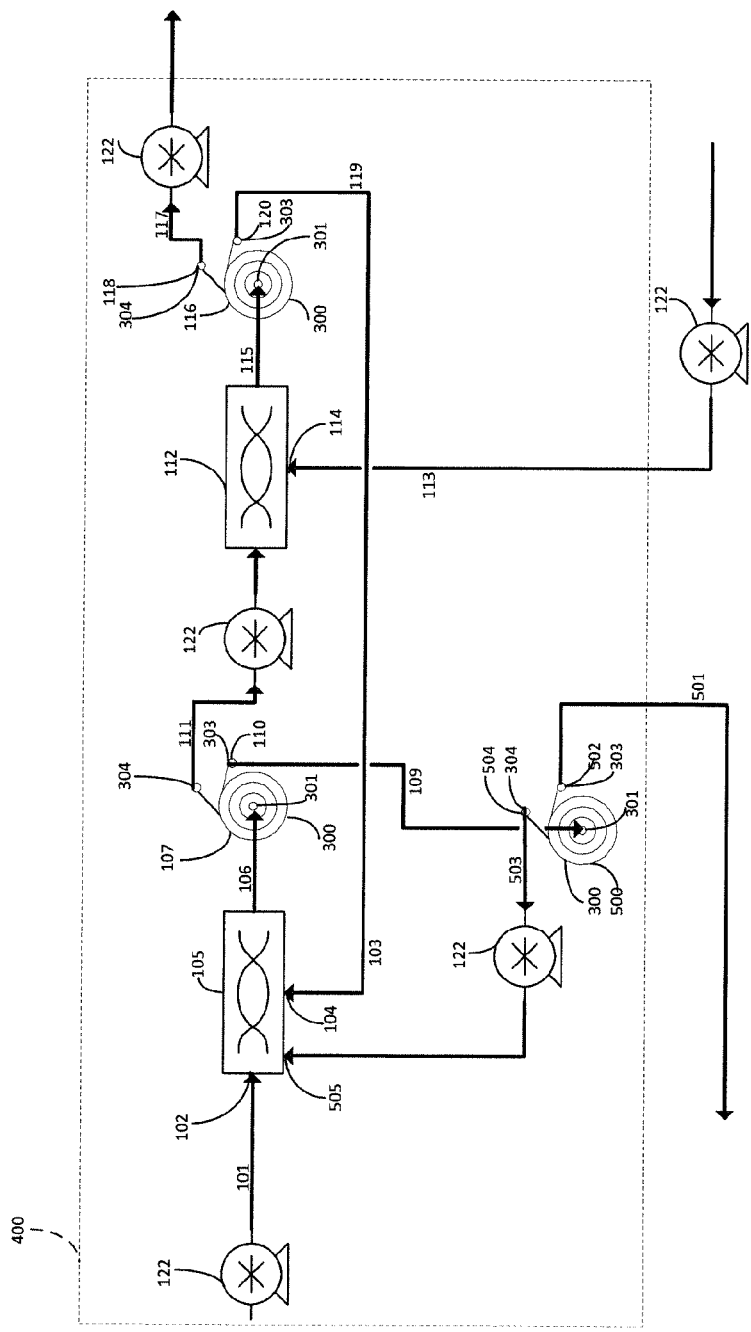
FIG. 5 is a schematic representation of a continuous countercurrent spiral chromatography module with recapture separation, according to an embodiment of the present disclosure.

Referring to FIG. 5, in one embodiment the continuous countercurrent spiral chromatography module 400 further including a recapture separator 500 for removing residual solid material from the stage I liquid fraction 109 exiting the first output port 110, producing a separated stage I liquid fraction 501 which exits the continuous countercurrent spiral chromatography module 400 from a fourth output port 502 and a recycled stage I solid fraction 503 which exits the recapture separator 500 through a fifth output port 504 and is fed into the first mixer 105 through a fourth input port 505 to be mixed with the input solution 101 and the recycled solution 103 into the first mixed output 106. The recapture separator 500 may be a spiral separator 300 (shown) or a tangential flow filter 108 (not shown). The solid material may include resin. In one embodiment, the solid material includes resin which is not separated into the stage I solid fraction 111 by the stage I separator 107.

Referring to FIGS. 6-9, in one embodiment, at least one tangential flow filter 108 in the continuous countercurrent tangential chromatography system 200 of FIG. 2 is replaced by a spiral separator 300, forming a continuous countercurrent spiral chromatography system 600. The continuous countercurrent spiral chromatography system 600 has a plurality of modules and includes a binding step module 210 for binding product from an unpurified product solution with a resin slurry, a washing step module 220 for washing impurities from the resin slurry, and a regeneration step module 240 for regenerating the resin slurry. At least one of the plurality of modules includes a plurality of stages with a solid fraction flow directed countercurrent to a resin slurry flow within at least one of the plurality of modules, and at least one of the plurality of modules includes a spiral separator 300. The plurality of modules may include any suitable combination of continuous countercurrent tangential chromatography modules 100 and continuous countercurrent spiral chromatography modules 400 for each of the plurality of modules. The plurality of modules may further include an elution step module 230 for eluting an output of the washing step module 220 as purified product solution, an equilibration step module 250 for equilibrating the continuous countercurrent spiral chromatography system 600 using an appropriate buffer, or both. The appropriate buffer may include, but is not limited to, a neutral buffer.

In one embodiment, the continuous countercurrent spiral chromatography system 600 includes a solid particle load separation capacity of at least about 10 wt %, alternatively at least about 12 wt %, alternatively at least about 14 wt %, alternatively at least about 16 wt %, alternatively at least about 18 wt %, alternatively at least about 20 wt %, alternatively at least about 22 wt %, alternatively at least about 24 wt %, alternatively at least about 26 wt %, alternatively at least about 28 wt %, alternatively at least about 30 wt %.

Figure 6:
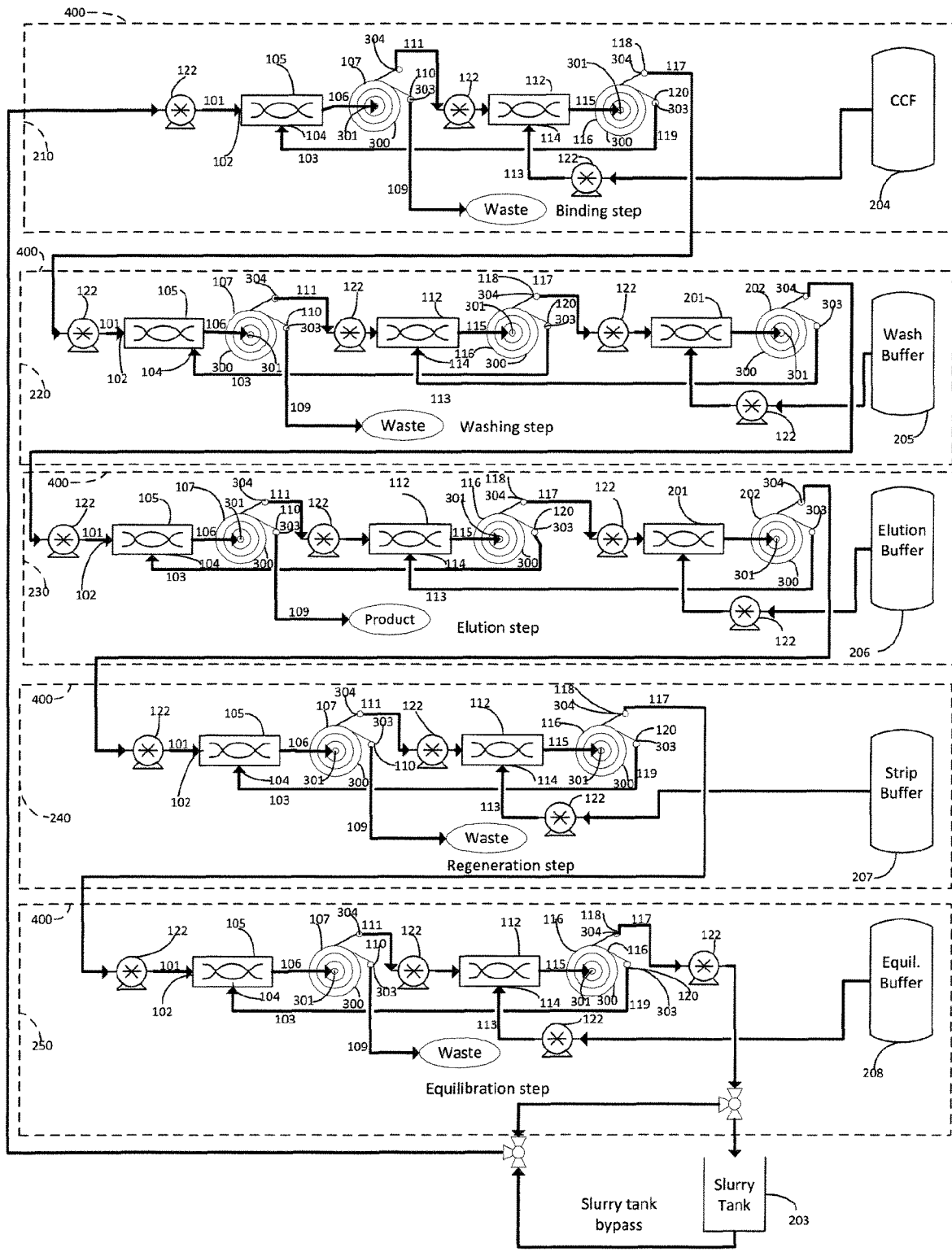
FIG. 6 is a schematic representation of a continuous countercurrent spiral chromatography system in bind-elute mode, according to an embodiment of the present disclosure.
Figure 7:
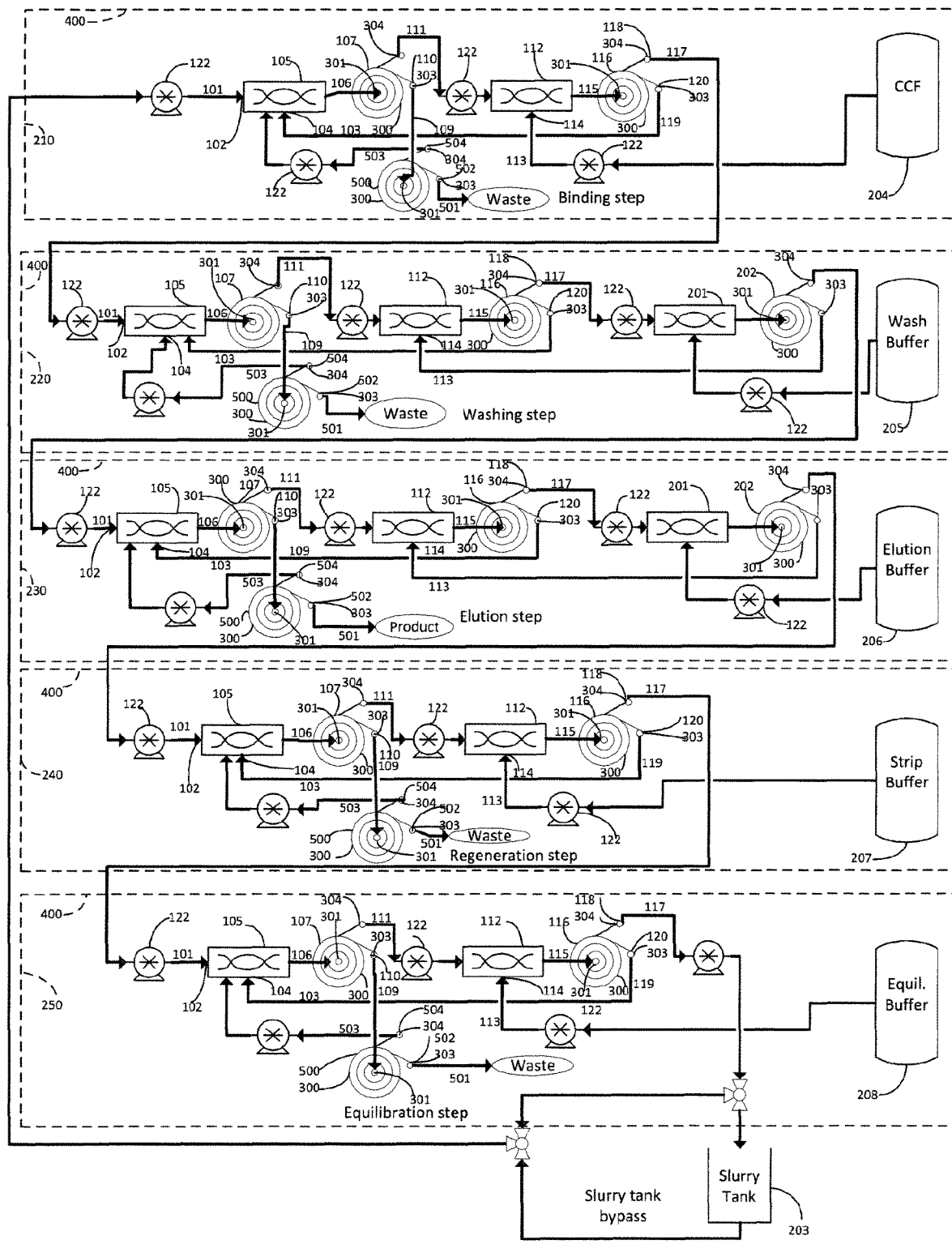
FIG. 7 is a schematic representation of a continuous countercurrent spiral chromatography system in bind-elute mode with recapture separation, according to an embodiment of the present disclosure.
Figure 8:
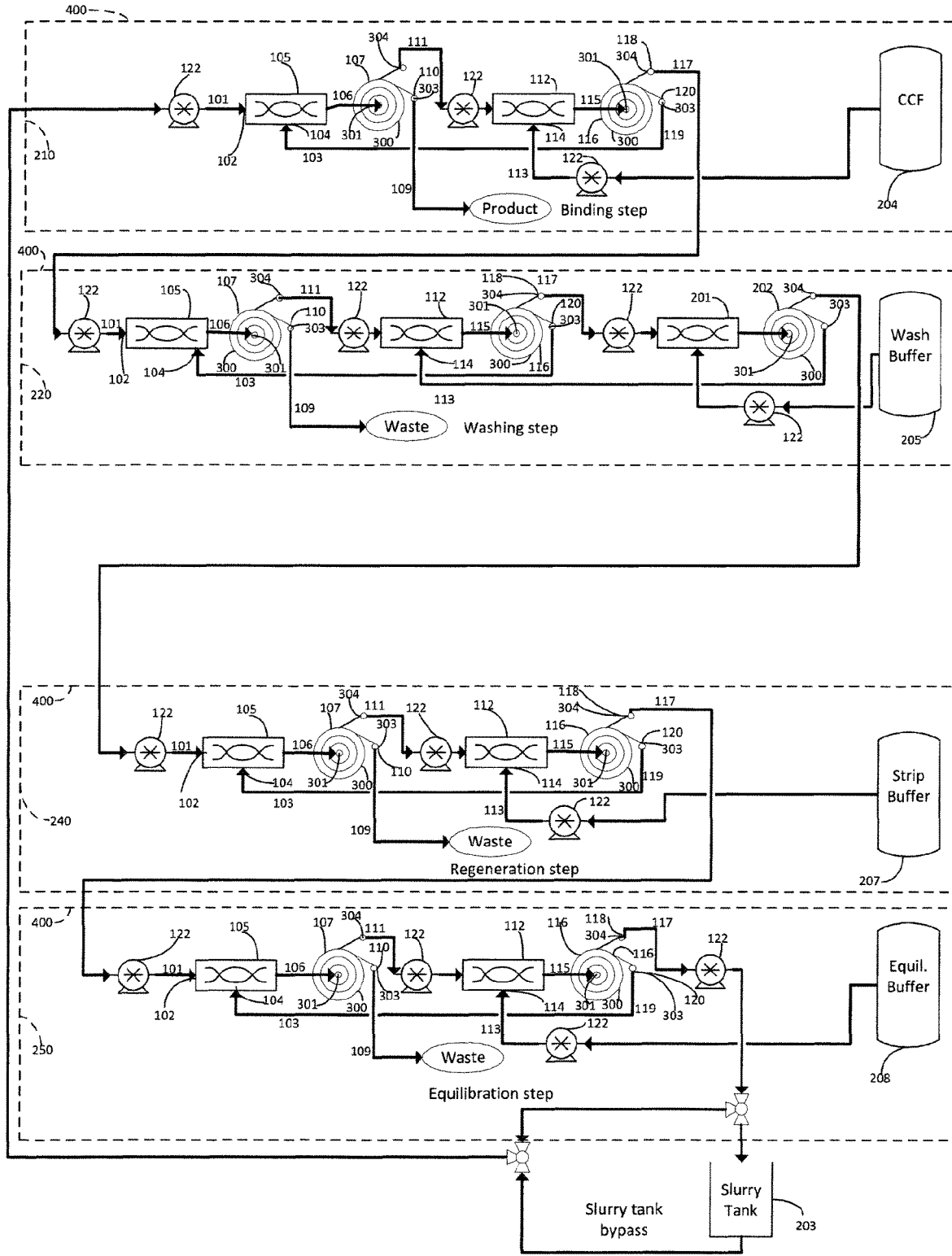
FIG. 8 is a schematic representation of a continuous countercurrent spiral chromatography system in flow-through mode, according to an embodiment of the present disclosure.
Figure 9:
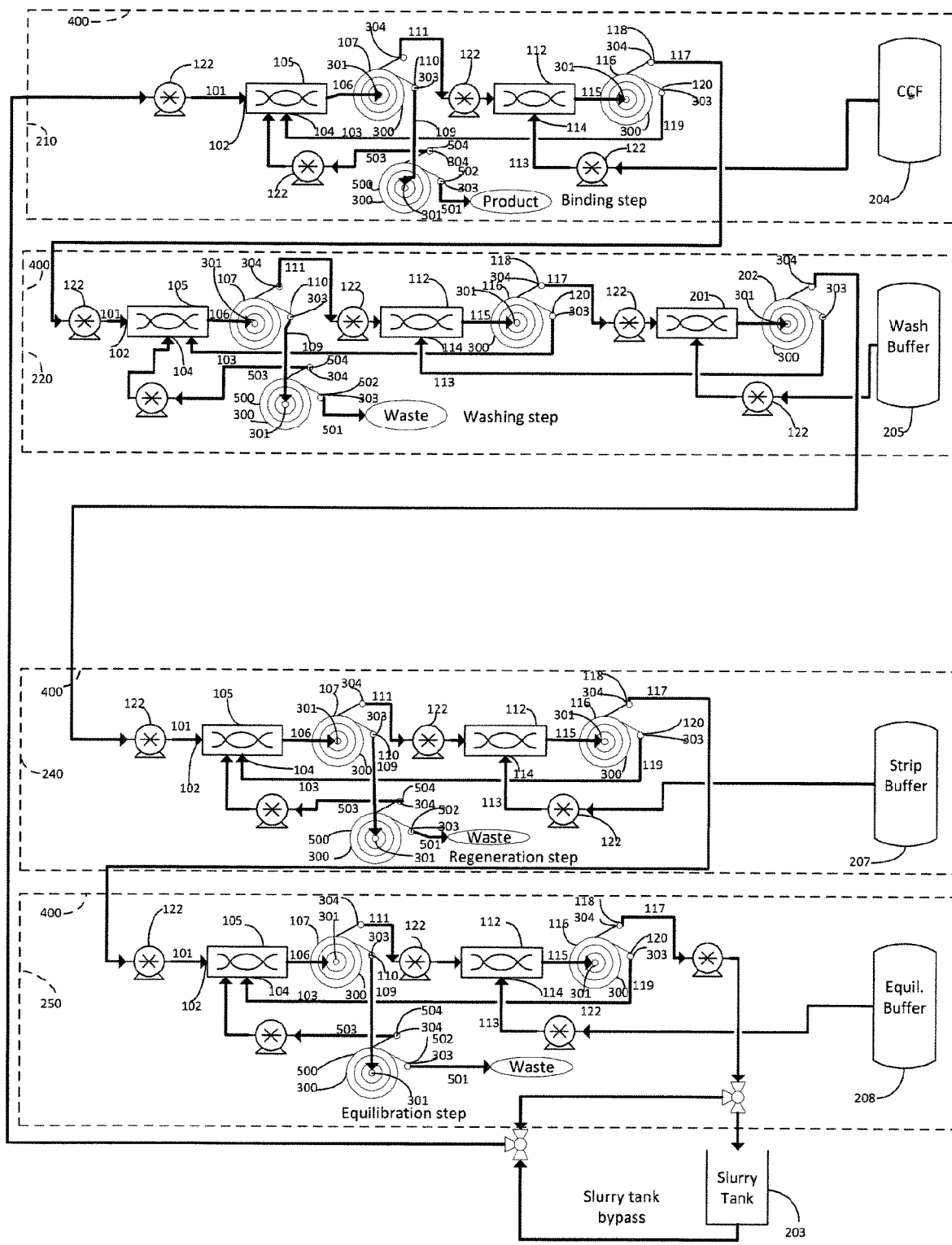
FIG. 9 is a schematic representation of a continuous countercurrent spiral chromatography system in flow-through mode with recapture separation, according to an embodiment of the present disclosure.

Referring to FIGS. 6 and 7, in one embodiment, the continuous countercurrent spiral chromatography system 600 includes a binding step module 210, a washing step module 220, an elution step module 230, a regeneration step module 240, and an equilibration step module 250, and operates in a bind-elute mode. Referring to FIGS. 8 and 9, in another embodiment, the continuous countercurrent spiral chromatography system 600 includes a binding step module 210, a washing step module 220, a regeneration step module 240, and an equilibration step module 250, but does not include an elution step module 230, and operates in a flow-through mode.

Referring to FIGS. 6 and 8, in one embodiment, the continuous countercurrent spiral chromatography system 600 does not include a continuous countercurrent spiral chromatography module 400 having a recapture separator 500. Referring to FIGS. 7 and 9, in another embodiment, the continuous countercurrent spiral chromatography system 600 includes at least one continuous countercurrent spiral chromatography module 400 having a recapture separator 500. The continuous countercurrent spiral chromatography system 600 may include any suitable number of modules having a recapture separator 500, ranging from no continuous countercurrent spiral chromatography modules 400 to a single continuous countercurrent spiral chromatography module 400, to every continuous countercurrent spiral chromatography module 400, and any combination of continuous countercurrent spiral chromatography modules 400 in between. Inclusion of at least one recapture separator 500 in the continuous countercurrent spiral chromatography system 600 may remove residual resin from a liquid fraction produced during operation of the continuous countercurrent spiral chromatography system 600, reducing resin loss during operation relative to a comparative system lacking the recapture separator 500.

Referring again to FIGS. 6-9, in one embodiment, the continuous countercurrent spiral chromatography system 600 includes an operation pressure of less than about 30 psi, alternatively less than about 20 psi, alternatively less than about 18 psi, alternatively less than about 15 psi, alternatively between about 1 psi to about 20 psi, alternatively between about 2 psi and about 18 psi.

Figure 10:
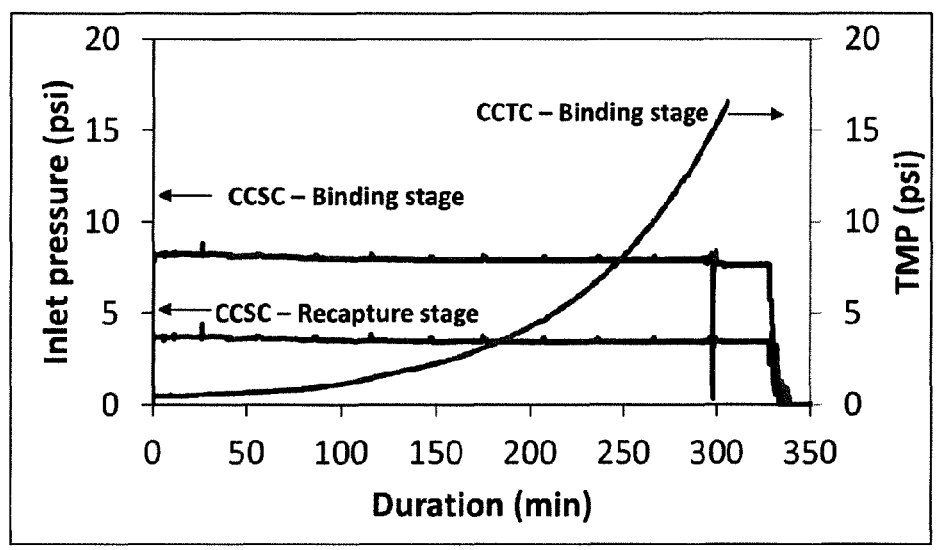
FIG. 10 discloses a comparison of binding state fouling data, according to an embodiment of the present disclosure.

Referring to FIG. 10, the pressure profile of a binding step module 210 of a continuous countercurrent spiral chromatography system 600 is shown in comparison to the pressure profile in a binding step module 210 of a continuous countercurrent tangential chromatography system 200, evidencing that the pressure profile was stable in the continuous countercurrent spiral chromatography system 600, with no significant fouling in the continuous countercurrent spiral chromatography system 600, whereas the countercurrent tangential chromatography system 200 suffered from membrane fouling under the same conditions.

Figure 11:
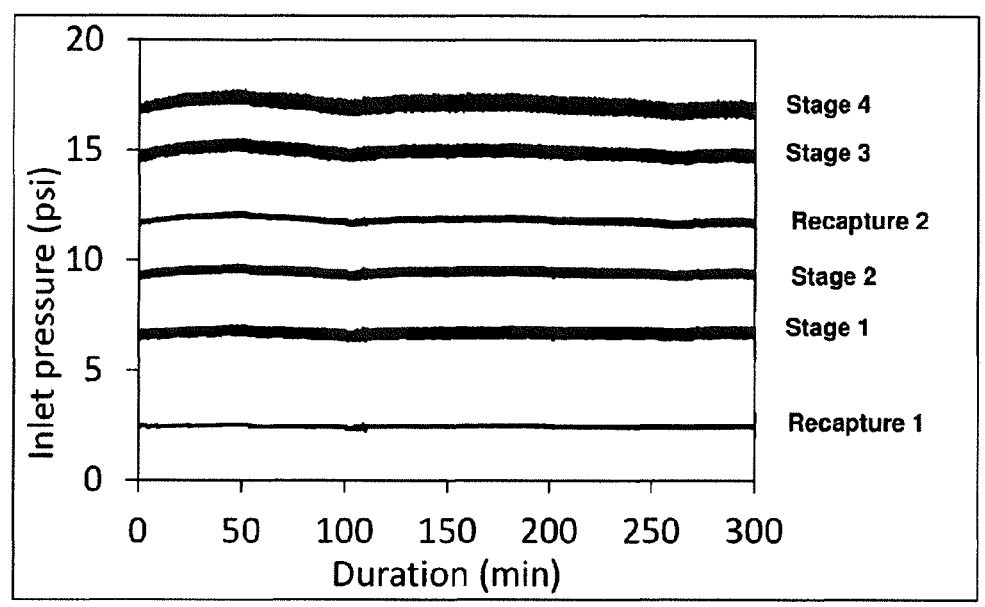
FIG. 11 discloses pressure profiles during the elution step of a continuous countercurrent spiral chromatography system, according to an embodiment of the present disclosure.

Referring to FIG. 11, the pressure profile of an elution step having four elution step modules 230 of a continuous countercurrent spiral chromatography system 600 is shown, demonstrating that the pressure profile in the elution portion of the continuous countercurrent spiral chromatography system 600 is stable under operating conditions with no significant fouling.

Figure 12:
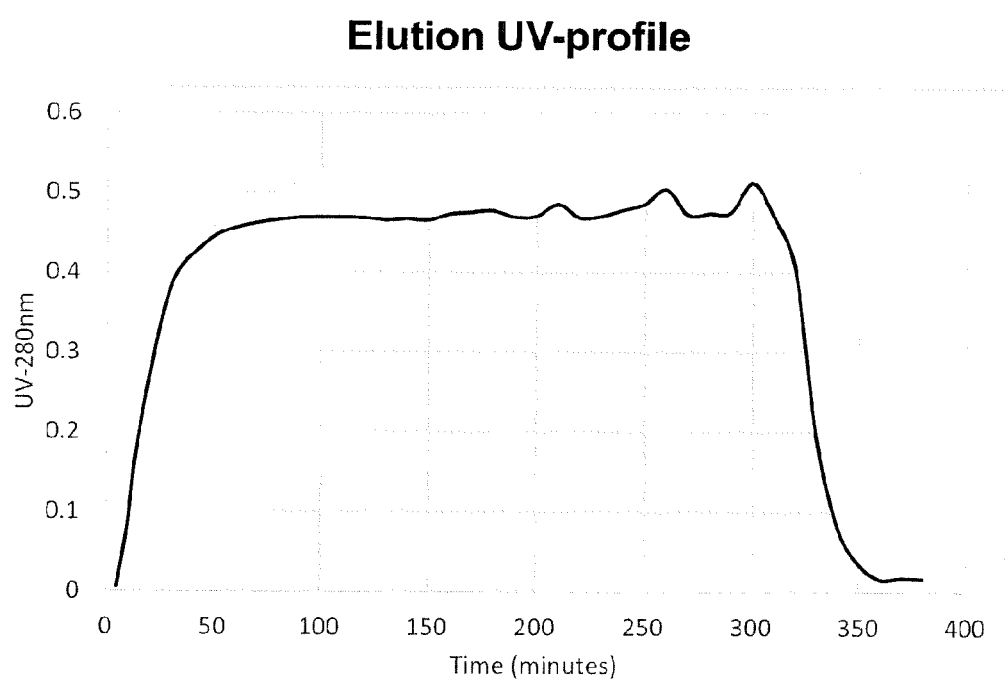
FIG. 12 discloses an elution UV profile of a continuous countercurrent spiral chromatography system, according to an embodiment of the present disclosure.

Referring to FIG. 12, a UV A280 profile of protein samples obtained as product from an elution step module 230 demonstrates stable operation of the elution step module 230.

In one embodiment, a method for purifying an unpurified solution by continuous countercurrent spiral chromatography with a plurality of modules includes receiving the unpurified solution, receiving resin slurry from a resin slurry tank 203 for containing the resin slurry, the resin slurry tank 203 being isolated following discharge of the resin slurry from the resin slurry tank 203, a binding step for binding either product or impurities in the unpurified product solution to the resin slurry from the resin slurry tank 203, a washing step for washing impurities or recovering unbound product from the resin slurry, optionally an elution step for eluting product from the resin slurry after the washing step, capturing purified product solution, a regeneration step for cleaning the resin slurry, and providing buffer solutions for the steps.

Purifying the unpurified solution may include purifying any suitable composition, desalinating salt water, performing any suitable chromatographic process, or combinations thereof. Suitable compositions include, but are not limited to, commodity chemicals, sugars, amino acids, nanoparticles, medicinal drugs, antibiotics, statins, proteins, monoclonal antibodies, bi-specific antibodies, fusion proteins, antibody drug conjugates, enzymes, viral-like particles, vaccines, gene therapy agents, or combinations thereof. Suitable chromatographic processes include, but are not limited to, chromatographic capture, chromatographic flow-through, chromatographic antibody capture with protein A resins, chromatographic ion exchange, chromatographic hydrophobic interactions, chromatographic metal affinity, chromatographic mixed mode, chromatographic hydroxyapatite, chromatographic affinity ligand, chromatographic aptamer-based, chromatographic reverse phase separations, or combinations thereof.

Accordingly, while the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

Finally, while the invention has been particularly shown and described with reference to particular embodiments thereof, it will be understood by those skilled in the art that various other changes in the form and details may be made without departing from the spirit and scope of the invention, as defined in the appended claims.

What is claimed is:
1. A continuous countercurrent spiral chromatography module, comprising:
   a first input port for receiving an input solution;
   a first mixer for mixing the input solution with a recycled solution from a second input port to produce a first mixed output;

a stage I separator for concentrating the first mixed output to produce a stage I solid fraction, wherein a stage I liquid fraction exits the stage I separator via a first output port;

a second mixer for mixing the stage I solid fraction from the stage I separator and an optional buffer solution from a third input port to produce a second mixed output;

a stage II separator for concentrating the second mixed output to produce a stage II solid fraction which exits the module from the stage II separator via a second output port, wherein a stage II liquid fraction exits the module from the stage II separator via a third output port; and at least one pump, wherein the recycled solution from the third output port flows countercurrent to the input solution into the second input port, and wherein at least one of the stage I separator and the stage II separator is a spiral separator, the spiral separator including:
at least one inlet;
a curvilinear channel arranged and disposed to generate at least one Dean vortex;
at least one liquid fraction outlet; and
at least one solid fraction outlet.

2. The module of claim 1, wherein both the stage I separator and the stage II separator are spiral separators.

3. The module of claim 1, wherein at least one of the stage I separator and the stage II separator is a tangential flow filter.

4. The module of claim 1, wherein the input solution includes a resin and an unpurified product solution.

5. The module of claim 1, wherein the stage I liquid fraction is waste.

6. The module of claim 1, wherein the stage I liquid fraction is product.

7. The module of claim 1, wherein the second mixer receives clean buffer solution.

8. The module of claim 1, wherein the second mixer does not receive clean buffer solution.

9. The module of claim 1, wherein the first mixer and the second mixer are static mixers.

10. The module of claim 1, wherein the input solution from the first input port flows through the stage I separator and the stage II separator in a single pass.

11. The module of claim 1, further including a recapture separator for removing a solid material from the stage I liquid fraction exiting the first output port, producing a separated stage I liquid fraction which exits the module from a fourth output port and a recycled stage I solid fraction which exits the recapture separator through a fifth output port and is fed into the first mixer through a fourth input port to be mixed with the input solution and the recycled solution into the first mixed output.

12. The module of claim 11, wherein the recapture separator is a spiral separator.

13. The module of claim 11, wherein the recapture separator is a tangential flow filter.

14. The module of claim 11, wherein the solid material includes a resin.

15. The module of claim 11, further including a solid particle load separation capacity of at least about 10 wt %.

16. A continuous countercurrent spiral chromatography system having a plurality of modules, comprising:
a binding step module for binding product from an unpurified product solution with a resin slurry;
a washing step module for washing impurities from the resin slurry; and
a regeneration step module for regenerating the resin slurry,
wherein at least one of the plurality of modules is a continuous countercurrent spiral chromatography module including:
a first input port for receiving an input solution;
a first mixer for mixing the input solution with a recycled solution from a second input port to produce a first mixed output;
a stage I separator for concentrating the first mixed output to produce a stage I solid fraction, wherein a stage I liquid fraction exits the stage I separator via a first output port;
a second mixer for mixing the stage I solid fraction from the stage I separator and an optional buffer solution from a third input port to produce a second mixed output;
a stage II separator for concentrating the second mixed output to produce a stage II solid fraction which exits the module from the stage II separator via a second output port, wherein a stage II liquid fraction exits the module from the stage II separator via a third output port; and
at least one pump,
wherein the recycled solution from the third output port flows countercurrent to the input solution into the second input port, and
wherein at least one of the stage I separator and the stage II separator is a spiral separator, the spiral separator including:
at least one inlet;
a curvilinear channel arranged and disposed to generate at least one Dean vortex;
at least one liquid fraction outlet; and
at least one solid fraction outlet.

17. The system of claim 16, further including at least one of an elution step module for eluting an output of the washing stage module as purified product solution and an equilibration step module for equilibrating the system using an appropriate buffer.

18. The system of claim 16, wherein at least one of the plurality of modules includes a recapture separator for removing residual resin from a liquid fraction produced during operation of the system, and the system reduces resin loss during operation relative to a comparative system lacking the recapture separator.

19. A method for purifying an unpurified solution by continuous countercurrent spiral chromatography with a plurality of modules, comprising:
receiving the unpurified solution;
receiving resin slurry from a resin slurry tank for containing the resin slurry, the resin slurry tank being isolated following discharge of the resin slurry from the resin slurry tank;
a binding step for binding product in the unpurified product solution to the resin slurry from the resin slurry tank;
a washing step for washing impurities from the resin slurry;
optionally, an elution step for eluting product from the resin slurry after the washing step;
capturing purified product solution;
a regeneration step for cleaning the resin slurry; and
providing buffer solutions for the steps, wherein at least one of the plurality of modules is a continuous countercurrent spiral chromatography module including:
- a first input port for receiving an input solution;
- a first mixer for mixing the input solution with a recycled solution from a second input port to produce a first mixed output;
- a stage I separator for concentrating the first mixed output to produce a stage I solid fraction, wherein a stage I liquid fraction exits the stage I separator via a first output port;
- a second mixer for mixing the stage I solid fraction from the stage I separator and an optional buffer solution from a third input port to produce a second mixed output;
- a stage II separator for concentrating the second mixed output to produce a stage II solid fraction which exits the module from the stage II separator via a second output port, wherein a stage II liquid fraction exits the module from the stage II separator via a third output port; and
- at least one pump,
- wherein the recycled solution from the third output port flows countercurrent to the input solution into the second input port, and wherein at least one of the stage I separator and the stage II separator is a spiral separator, the spiral separator including:
- at least one inlet;
- a curvilinear channel arranged and disposed to generate at least one Dean vortex;
- at least one liquid fraction outlet; and
- at least one solid fraction outlet.

20. The method of claim 19, wherein purifying the unpurified solution includes:
- purifying: commodity chemicals, sugars, amino acids, nanoparticles, medicinal drugs, antibiotics, statins, proteins, monoclonal antibodies, bi-specific antibodies, fusion proteins, antibody drug conjugates, enzymes, viral-like particles, vaccines, gene therapy agents, or combinations thereof;
- desalinating salt water;
- performing chromatographic: capture, flow-though, antibody capture with protein A resins, ion exchange, hydrophobic interactions, metal affinity, mixed mode, hydroxyapatite, affinity ligand, aptamer-based, reverse phase separations, or combinations thereof; or
- combinations thereof.

* * * * *